United States Patent Office 3,174,981
Patented Mar. 23, 1965

3,174,981
PROCESS FOR THE PREPARATION OF A STABLE COMPLEX OF BROMINE AND PYRROLIDONE-2
Wiley Edgar Daniels, Easton, Pa., assignor to General Aniline & Film Corporation, New York, N.Y., a corporation of Delaware
No Drawing. Filed Apr. 27, 1962, Ser. No. 190,801
5 Claims. (Cl. 260—326.5)

The present invention relates to a method of producing a novel, stable complex of bromine and pyrrolidone-2, which has been found useful as a solid composition of matter capable of supplying free bromine for use in carrying out chemical reactions or as a germicide or disinfectant.

While bromine has long been recognized as an effective germicide, fungicide, and disinfectant, its use for these purposes has been quite restricted because of its high corrosive and toxic nature. We have now discovered that bromine can be complexed with pyrrolidone-2 so as to produce a novel compound containing 28 to 30% available bromine, which is a crystalline solid material and which possesses good storage stability.

It has long been known that pyrrolidone-2 and bromine will react at approximately 0° C. in chloroform (see Tafel and Wassmuth, Berichte, vol. 40, p. 2835) according to the following equations:

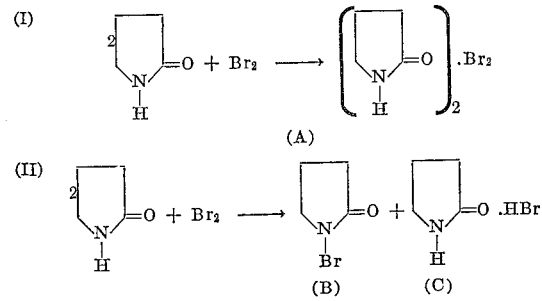

At ice temperatures, reaction I predominates and the product isolated is a mixture of compounds A and C above in such proportions that there is 4.32% ionic bromide and 43.82% available bromine in the product. Product B remains in the filtrate and is lost. The thus obtained mixture of products A and C is quite unstable, gradually losing its available bromine content over a period of time, with a corresponding build-up of the ionic bromide. Thus, after one month's storage of the above product, at room temperature, it was found to contain 11.76% ionic bromide and 35.52% available bromine. Such a product forms an unreliable source of bromine for carrying out reactions as a disinfectant, germicide, etc., since it would require analysis before each use to avoid use of greater amounts than necessary in order to compensate for deterioration.

I have now found that by reacting a concentrated solution of pyrrolidone-2 in an inert solvent selected from the group consisting of aromatic hydrocarbons and halogenated aliphatic and aromatic hydrocarbons, with elemental bromine at a molar ratio of 2 to 1 and at a temperature of 55 to 75° C. there is obtained on cooling the reaction mixture a stable complex of pyrrolidone-2 and bromine containing 28 to 32% available bromine and in which the available bromine titer is constant within a 1 to 2% range for a substantial period of time.

The properties desired in the inert solvent in which the present reaction is carried out are that the solvent (1) does not react with bromine at the temperatures of the reaction 55–75° C., (2) is readily soluble or miscible with pyrrolidone, but preferably has low solvent action, polypyrrolidone-bromine complex since this facilitates recovery of the product, and (3) the boiling point is such as preferable to permit a reaction temperature at atmospheric pressure in the desired range of 55–75° C. Suitable aromatic hydrocarbons for carrying out the present reaction include benzene and toluene and mixtures thereof, while suitable halogenated hydrocarbons both aliphatic and aromatic include chloroform, carbon tetrachloride, ethylene dichloride, ethylene tetrachloride, methylene dibromide, 1,2-dibromoethane and chlorobenzene.

The details of the present invention will be apparent from a consideration of the following specific examples thereof:

*Example 1*

To a solution of 1200 g. (14.1 mole) (1074 ml.) of pyrrolidone in
700 ml. of chloroform and heated to 60° C., there was added
1105 g. of elemental bromine (6.9 moles) (354 ml.) over a 2 hour period. The temperature was maintained at 60–70° C. by intermittent cooling with ice water. The reaction mixture was then cooled and the bright orange crystals which formed were filtered off after there had been added
1 l. of chloroform to facilitate filtration. The product was dried in vacuum (about 40 mm. Hg) to constant weight whereupon
1498 g. of product containing 30.9% available bromine was obtained.

The thus obtained material is found to contain approximately 61% of product A above and 39% of product C above. Its melting range was 74 to 84° C. The following is a 5-month storage stability record (at room temperature) as followed by iodimetric determination of available bromine.

| Date | Time Stored | Available Bromine, percent |
|---|---|---|
| 6/60 | 0 days | 30.9; 30.8 |
| 6/60 | 9 days | 31.1; 31.1 |
| 7/60 | 31 days | 30.3; 30.4 |
|  | 6 weeks | 30.6; 30.1 |
|  | 3 months | 30.4; 30.4 |
|  | 5½ months | 29.8; 29.8 |

The data for the first three months are within experimental error and even the data at the end of 5½ months is only 1.2% lower than the highest figure reported. At the end of the storage period the product had developed a semi-sweet odor and had become slightly moist to the touch. It is believed that towards the end of the storage period some solid state self-bromination occurred to yield products of the type

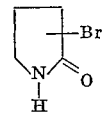

*Example 2 (comparative)*

For purposes of comparison the following example is given illustrating the preparation of pyrrolidone bromine complex pursuant to the prior art:

To a solution of 1160 g. (13.7 moles) (1050 ml.) of pyrrolidone-2 in
700 ml, of chloroform maintained at +d to +7° C. by an ice pack, was added
1075 g. (6.70 moles) (344 ml.) of elemental bromine over a period of 4 hours and 15 minutes. The reaction mixture was then filtered and the product dried as in Example 1. There was obtained 1727 g. of product containing 43.82% available bromine.

NOTE.—Increasing the pyrrolidone to bromine ratio does not yield product of lower percent available bromine.

This product was found to be unstable on storage at room temperature as illustrated by the following table:

| Date | Days Stored | Available Bromine, percent |
| --- | --- | --- |
| 3/60 | 0 | 43.82 |
| 4/60 | 7 | 37.30 |
| 4/60 | 14 | 35.80 |
| 4/60 | 21 | 35.52 |

Example 3

This example illustrates the use of a nonhalogenated inert aromatic solvent for the preparation of my procedure.

In a 1 l. RB flask equipped with stirrer, thermometer, reflux condenser, and addition funnel was placed 300 mls. of benzene, and
154 mls. (2.0 moles) of pyrrolidone. The solution was heated to 65° C. and
52 mls. (1.0 mole) of bromine added at such a rate to maintain the temperature between 63° and 70° C. The solution was then cooled in ice water to 26° C., and the resulting product filtered and dried to constant weight in vacuum.
308.0 g. were obtained having an available bromine content of 31.1%.

Example 4

This example illustrates the use of 1,2-dibromoethane as a solvent for the preparation of my procedure.

In a 500 ml. RB flask equipped with stirrer, thermometer, condenser, and dropping funnel was placed 156 mls. (2.0 moles) of pyrrolidone and
100 mls. of dibromoethane. The solution was heated to 60° C. with stirring when
52 mls. (1.0 mole) of bromine was added dropwise. The temperature was kept between 60 and 70° C. After all the bromine was added, the solution was left to cool to room temperature, at which time it was poured into a beaker and cooled in ice water. The red product which separated was filtered and washed with benzene and then chloroform to remove occluded dibromoethane. After drying in vacuum overnight,
260 g. of brick-red solid was obtained, containing 31.7% available bromine by iodimetric titration.

Example 5

This example illustrates the use of chlorobenzene as solvent for the preparation of my procedure.

Pyrrolidone was reacted with bromine in exactly the same manner as in Example 4, except that chlorobenzene, 100 mls., was used as solvent.

After isolation, washing, and drying as in Example 6, there was obtained 255 g. of brick-red solid containing 31.4% available bromine by iodimetric titration.

It has been found that the novel product of the present invention can be diluted with inert solid materials so as to form dry, free-flowing powders, or if desired, the diluted material can be pressed into solids containing a predetermined amount of bromine. Suitable dilutants for this purpose include kaoline, sodium sulfate, calcium silicate, aluminum silicate, and the like. When the material is to be pelleted, the incorporation of a small amount of polyvinyl pyrrolidone would be advantageous to serve as a binder.

It will be recognized that the novel products of the present invention represent a safe and convenient way of "carrying" bromine and of particular advantage in applications where the use of elemental bromine might be hazardous or difficult. For example: as a germicide for swimming pools where metering apparatus could be dispensed with, as a preservative for animal or poultry feed, in oil well drilling to kill metal corroding bacteria; to purify water for industrial use, to kill weeds, mosquito larvae, etc.; for organic brominations in which elemental bromine is too active; as an analytical reagent in which bromine could be efficiently and accurately weighed out.

I claim:

1. A method of producing a solid, stable complex of bromine and pyrrolidone-2 which comprises reacting at a temperature of 55° to 75° C. two molar proportions of pyrrolidone-2 dissolved in an inert solvent selected from the class consisting of halogenated alkanes having 1 to 2 carbon atoms, halogenated benzene and monocyclic aryl hydrocarbons with one molar proportion of elemental bromine, cooling the reaction mixture and recovering the thus found crystalline complex of bromine and pyrrolidone-2.

2. The method as defined in claim 1 wherein the inert solvent is chloroform.

3. The method as defined in claim 1 wherein the inert solvent is benzene.

4. The method as defined in claim 1 wherein the inert solvent is 1,2-dibromoethane.

5. The method as defined in claim 1 wherein the inert solvent is chlorobenzene.

No references cited.